(12) United States Patent
Mac

(10) Patent No.: US 6,328,371 B1
(45) Date of Patent: Dec. 11, 2001

(54) VEHICLE SUN VISOR

(76) Inventor: Tony Mintung Mac, 2674, 47$^{th}$ Ave., San Francisco, CA (US) 94116

(*) Notice: Subject to any disclaimer, the term of this patent is extended or adjusted under 35 U.S.C. 154(b) by 0 days.

(21) Appl. No.: 09/639,502

(22) Filed: Aug. 17, 2000

(51) Int. Cl.$^7$ ................................. B60J 3/02; B60J 3/04
(52) U.S. Cl. .................... 296/97.13; 296/97.2; 296/97.9
(58) Field of Search ................. 296/97.1, 97.2, 296/97.8, 97.9, 97.12, 97.13

(56) References Cited

U.S. PATENT DOCUMENTS

| | | |
|---|---|---|
| 1,434,750 | 11/1922 | Pratt . |
| 1,567,480 | 12/1925 | Wood . |
| 2,204,691 | 6/1940 | Olsen . |
| 2,422,863 | 6/1947 | Stroth . |
| 2,681,824 * | 6/1954 | Knoblock ................................ 296/97 |
| 2,912,275 * | 11/1959 | O'Neal .................................. 296/97 |
| 2,965,416 * | 12/1960 | Dryden ................................. 296/97 |
| 3,259,424 | 7/1966 | Swick . |
| 3,306,657 | 2/1967 | Turn . |
| 3,378,297 * | 4/1968 | Ternes et al. ......................... 296/97 |
| 4,023,854 | 5/1977 | Nack, Jr. . |
| 4,090,732 | 5/1978 | Vistitsky . |
| 4,666,205 * | 5/1987 | Nakagawa ............................. 296/97 |
| 4,728,142 | 3/1988 | Gavagan . |
| 4,925,232 * | 5/1990 | Hemmeke et al. ................. 296/97.8 |
| 5,211,439 | 5/1993 | Smith et al. . |
| 5,338,083 * | 8/1994 | Gute .................................... 296/97.9 |
| 5,380,057 * | 1/1995 | Wevers ............................... 296/97.11 |
| 6,068,323 * | 5/2000 | Brown et al. ....................... 296/97.9 |
| 6,106,048 * | 8/2000 | Wright ............................... 296/97.13 |

* cited by examiner

Primary Examiner—Joseph D. Pape
Assistant Examiner—Greg Blankenship

(57) ABSTRACT

A vehicle sun visor provided with two pair of elongated semi-flexible light color panels. The two may overlap one another, or be used separately, to permit the necessary variation in transparency required for day and night time driving The vehicle sun visor can reduce glare from the sun's rays and from the headlights of an oncoming vehicle.

2 Claims, 2 Drawing Sheets

VEHICLE SUN VISOR

BACKGROUND OF THE INVENTION

This invention relates to an vehicle sun visor of the type which is pivotably mounted above the windshield of the vehicle to shade the eye of the driver and passenger from the sun and oncoming vehicle headlights. Conventional vehicle sun visors consist of a single panel which can be pivoted to a position in which some of the rays of the sun are prevented from reaching the eyes of the driver and passenger. Also they are non-transparent. Therefore, they obstruct the view when used in the daytime and they are totally useless for night driving. Accordingly, it has been proposed to provide two pair of semi-flexible light color sight panels which can be pivotably mounted adjacent the windshield of a vehicle and provide complete freedom of adjustability relative to the sun rays and oncoming vehicle headlights at various times of the day and night to shield the eyes of the vehicle driver and passenger.

SUMMARY OF THE INVENTION

In accordance with the invention, the sun visor includes two pair of semi-flexible light color sight panels which are attached to a elongated spring sleeve as by epoxy glue. Said panels clamped at an up turned end of the visor support cylindrical rods securely but yet permits said panels adjustment to suit the viewing needs and pivotably mounted adjacent the windshield of the vehicle. One of the semi-flexible light color panel can be used to shield the eyes of the vehicle operator or passenger from oncoming vehicle headlights or sun rays, another semi-flexible light color sight panel can be used to shield the sun rays or vehicle headlights from side of the vehicle to interfere driver sight and comfortable control vehicle. It is obvious that each panel can be used independently during day or night for driver and passenger to permitting adjustments to suit their viewing needs.

BRIEF DESCRIPTION OF THE DRAWING

Further objects and advantages of the invention will become apparent from the following description and claims and from the accompanying drawing, wherein:

DETAILED DESCRIPTION OF THE PREFERRED EMBODIMENT

Figure 1:
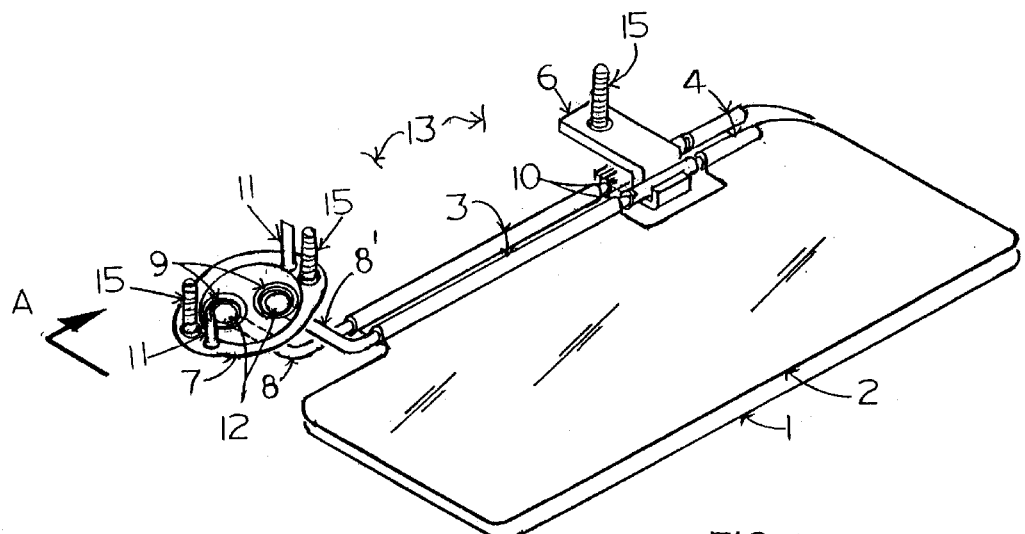
FIG. 1 is a perspective view of the vehicle sun visor of present invention.
Figure 2:
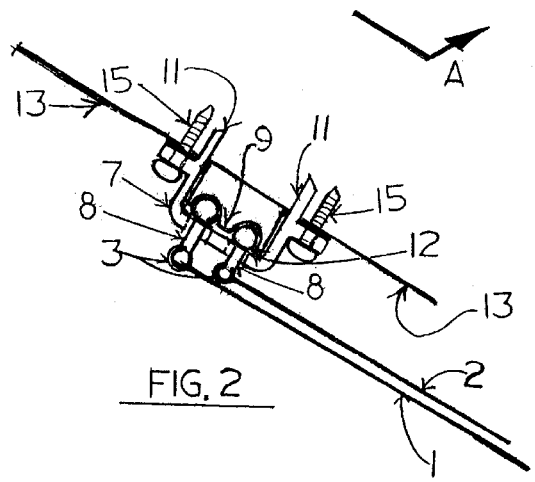
FIG. 2 is a section view taken substantially on the line A—A of FIG. 1.
Figures 3, 4:
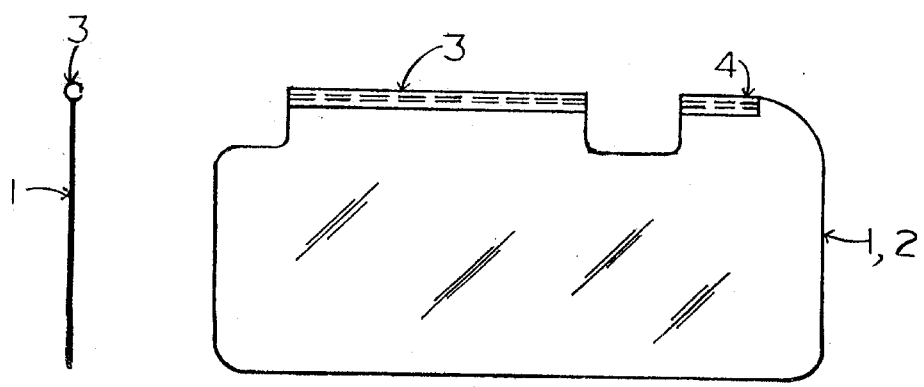
FIG. 3 and FIG. 4 are front and side views, respectively of an improved semi-flexible light color sight panel and the attached elongated spring sleeve as by epoxy glue.
Figure 5:
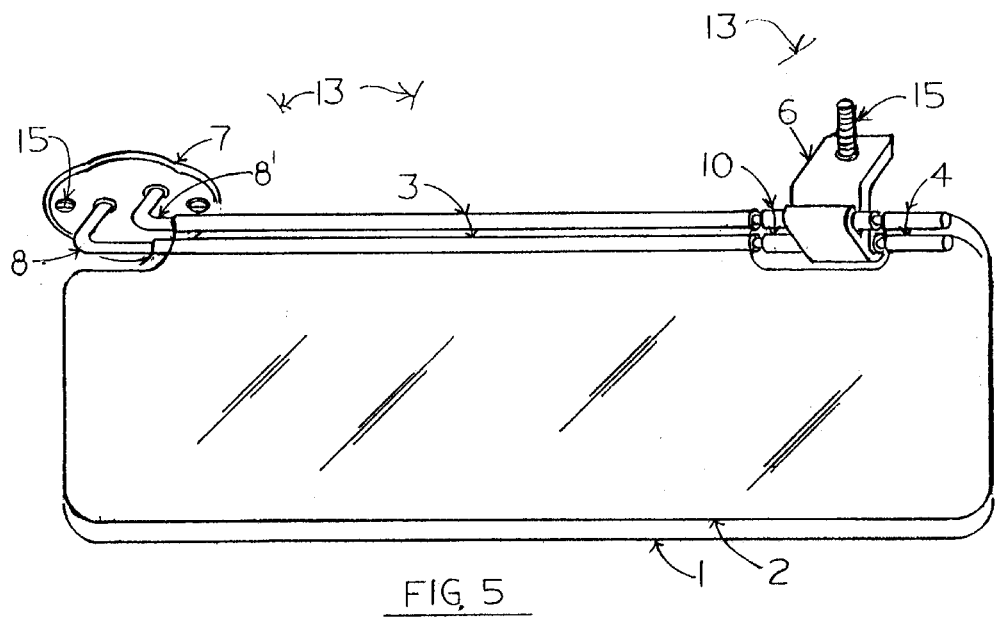
FIG. 5 is a front elevation of the vehicle sun visor of the present invention.
Figure 8:
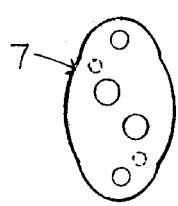
FIG. 8 AND FIG. 9 are front and side views, respectively of an improved visor bracket.
Figure 9:
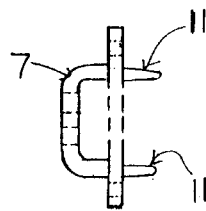
Figures 6, 7:
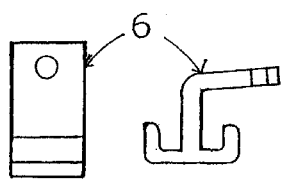
FIG. 6 AND FIG. 7 are front and side views, respectively of an improved visor hanger.
Figure 10:
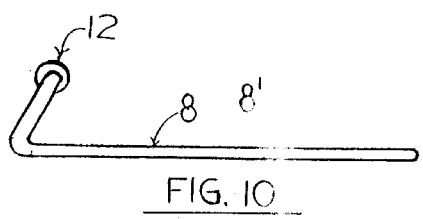
FIG. 10 is a perspective view of the visor support cylindrical rod.
Figures 15, 16:
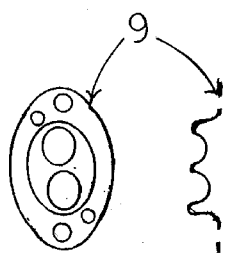
FIG. 15 and FIG. 16 are front and side view, respectively of the groove shape spring plate.
Figures 11, 12:
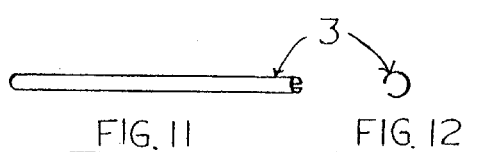
FIG. 11 and FIG. 12 are side and end views, respectively of a spring sleeve.
Figures 13, 14:
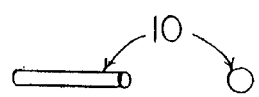
FIG. 13 and FIG. 14 are side and end views, respectively of a cylinder.

Referring now to the drawing in detail, wherein like numerals indicate like elements throughout the several views, the numeral 7 designates the mounting bracket, see FIGS. 1, 2, 5, 8 and 9 by which the visor is mounted to an upper interior surface of a motor vehicle 13. The bracket 7 outer surface being defined by a pair of aperture formed, the body portion extends in a ellipse formed integrally with two pins II and having two thread screw 15 extending through bracket base thereof for securement to the motor vehicle 13. A pair of up turned ends of visor support cylindrical rods 8 and 8' are penetrating the bracket 7 and held by a groove shaped spring plate 9, in this manner to permit the visor support cylindrical rods 8 and 8' to rotate 360 degrees and permit to operation at the desired position then which will remain in place after that position has been attained. The visor support rods 8 and 8' having a shorter right angle part with a round axle 12 and a longer horizontal part to penetrating spring sleeve 3, cylinder 10 and hanged at the visor hanger 6 then driven into the spring sleeve 4. Referring to FIGS. 1, 2, 3 and 5 the visor proper consists of two molded semi-flexible light color sight panels 1 and 2, panel 1 is sightly longer than panel 2 to permit pulling down one or both panels at a time. The panels 1 and 2 are attached to a spring sleeve 3 and 4 by a strong adhering substance such as epoxy glue. The spring sleeves are clamped on to an up turned end of the visor support cylindrical rods 8 and 8' whereby the spring is sleeve held in a friction grip on the supporting rods securely, but yet permits the panel 1 and 2 operated by hand at the desired position and remain in place after that position has been attained, to shield the eyes of driver and passenger from sun's rays and oncoming vehicle headlights.

While a specific embodiment of a vehicle sun visor has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A sun visor assembly comprising:

a mounting bracket adapted for attachment to a motor vehicle;

a pair of cylindrical rods coupled to the mounting bracket, each of said cylindrical rods is bent forming a right angle having a vertical part with a round axle disposed on an and there of and received within an aperture in the mounting bracket and being held by a groove shaped spring plate;

a pair of tinted panels, each secured on a horizontal part longer of the cylindrical rods, each horizontal part is longer than each vertical part;

an anchor shaped visor hanger that releasably retains both horizontal parts and is adapted for attachment to the motor vehicle.

2. The sun visor assembly of claim 1, wherein the tinted panels have spring sleeves which releasably retain the horizontal parts of said cylindrical rods, the cylindrical rods extend through the spring sleeves.

* * * * *